(12) United States Patent
Palmer (10) Patent No.: US 12,152,933 B2
(45) Date of Patent: Nov. 26, 2024

(54) AMBIENT LIGHT SENSORS

(71) Applicant: Snap One, LLC, Salt Lake City, UT (US)

(72) Inventor: Matthew Thomas Palmer, Sandy, UT (US)

(*) Notice: Subject to any disclaimer, the term of this patent is extended or adjusted under 35 U.S.C. 154(b) by 176 days.

(21) Appl. No.: 17/880,463

(22) Filed: Aug. 3, 2022

(65) Prior Publication Data

US 2024/0044699 A1    Feb. 8, 2024

(51) Int. Cl.
*G01J 1/04*     (2006.01)
*G01J 1/42*     (2006.01)
*G02B 6/42*     (2006.01)
*H05B 47/11*    (2020.01)

(52) U.S. Cl.
CPC ........... *G01J 1/0422* (2013.01); *G01J 1/4204* (2013.01); *G02B 6/4298* (2013.01); *H05B 47/11* (2020.01)

(58) Field of Classification Search
CPC ....... H01H 2219/018; H01H 2219/036; H01H 2219/038; H01H 2219/039; H01H 2219/044; H01H 2219/05; H01H 2219/054; H01H 2219/056; H01H 2219/0622; H01H 2219/064; H01H 9/16; H01H 9/161; H01H 9/181; H01H 13/00; H01H 13/04; H01H 13/14; H01H 13/50; H01H 13/705; H01H 15/24; H01H 2009/02; H01H 2009/16; H01H 2009/183; H01H 2009/186; H01H 2215/044; G02B 6/4298; G02B 6/42; G01J 1/0422; G01J 1/4204; G01J 1/04; G01J 1/42; H05B 47/11
See application file for complete search history.

(56) References Cited

U.S. PATENT DOCUMENTS 9,788,392 B2 * 10/2017 Kerr ....................... H05B 47/11

\* cited by examiner

*Primary Examiner* — Anthony R Jimenez (57) ABSTRACT

Examples of electrical devices are described herein. In some examples, an electrical device includes a button disposed to protrude through a window of a faceplate. A gap is disposed between the button and the faceplate. The electrical device includes an ambient light guide disposed to (1) reside behind the gap and (2) collect ambient light to pass through the gap. The electrical device includes an ambient light sensor configured to sense the ambient light collected by the ambient light guide.

10 Claims, 6 Drawing Sheets

AMBIENT LIGHT SENSORS

TECHNICAL FIELD

The present disclosure relates generally to structures and devices. More specifically, the present disclosure relates to ambient light sensors.

BACKGROUND

In recent years, the use of electrical devices has increased dramatically. Some electrical devices have also increased in capability and/or complexity.

Many varieties of electrical devices are conveniently used in homes and businesses. Many homes and businesses include multiple electrical devices to assist in everyday tasks. For example, electrical devices may be used for convenience and/or control.

However, some electrical devices may provide poor features, poor functionality, and/or may work inconsistently. For instance, some electrical devices may be arranged poorly, may fail to work, and/or may malfunction in some cases. As can be observed from this discussion, improvements to the reliability, functionality, and/or features of electrical devices may be beneficial.

DETAILED DESCRIPTION

An electrical device is described. The electrical device includes a button disposed to protrude through a window of a faceplate. A gap is disposed between the button and the faceplate. The electrical device also includes an ambient light guide disposed to (1) reside behind the gap and (2) collect ambient light to pass through the gap. The electrical device further includes an ambient light sensor configured to sense the ambient light collected by the ambient light guide.

The faceplate may include a bevel along the gap to permit ambient light entry into the gap from an oblique angle. The button may include a bevel along the gap to permit ambient light entry into the gap from an oblique angle. A size of the gap may be 5 millimeters or less.

The ambient light guide may include oblique surfaces to reflect light towards a center of the ambient light guide. The ambient light guide may extend over a majority of the gap in a width dimension.

The ambient light guide may include a light pipe extending from a collector structure towards the ambient light sensor. The light pipe may be polyhedral in shape. The light pipe may include an angled neck extending above a top surface of the collector structure of the ambient light guide. The electrical device may include a controller configured to control a backlight of the electrical device based on a sensed measurement of the ambient light produced by the ambient light sensor.

A method is also described. The method includes collecting, by an ambient light guide, ambient light passing through a gap between a structure and a faceplate of an electrical device. The ambient light guide is disposed behind the gap. The method also includes sensing, by an ambient light sensor, the ambient light collected by the ambient light guide.

An electrical device is a device that operates with electricity, that controls electricity, that receives electricity, and/or that provides electricity. Examples of an electrical device include a light switch, wall switch, dimmer, control panel, push button switch, keyboard, mouse, game controller, click pad, touch pad, keypad, doorbell, thermostat, sprinkler controls, vehicle console, power outlet, wall jack, light (e.g., path light, night light, etc.), etc. Some examples of the electrical devices described herein include and/or utilize a structure(s) (e.g., button(s)) in a cover opening (e.g., faceplate window).

In some examples, an electrical device may be configured to sense ambient light. For instance, an electrical device may include an ambient light sensor to detect and/or measure a level (e.g., brightness) of ambient light. In some approaches, an electrical device may include a light guide or light pipe to carry ambient light to an ambient light sensor. For instance, a light guide or light pipe may be disposed at an exterior of an electrical device to carry ambient light from the outside of the electrical device to the ambient light sensor. However, disposing a light guide or light pipe at the exterior of the electrical device may result in functional and/or design compromises. For instance, placing a light pipe at a button surface may restrict button motion and/or may require an additional mechanism to handle light pipe motion. In some approaches, placing a light pipe at a surface of an electrical device may require manufacturing an additional hole or opening on the surface to accommodate the light pipe. In some approaches, placing a light pipe at a surface of an electrical device may detract from a design consideration(s), such as solid surfaces and/or a clean appearance. It may be challenging to capture light below a surface of an electronic device. For instance, it may be difficult to capture enough light below the surface to accurately measure ambient light.

Some examples of the structures and techniques described herein may address one or more of the foregoing challenges. For instance, an ambient light sensor may be hidden behind a faceplate and may collect light through a narrow gap between a structure (e.g., button) and a faceplate. The ambient light sensor may provide expanded functionality while remaining hidden from a user. For instance, ambient light sensing may be utilized to determine an ambient light level, to control light production (e.g., light brightness, backlight brightness, etc.), and/or to report an ambient light level.

In some examples, a structure (e.g., button) may provide light and/or may be backlit. For instance, an electronic device may include a backlight to illuminate a button. A backlit button may provide increased visibility for a user(s). For instance, a backlit button (e.g., backlit light switch, backlit keyboard, backlit thermostat button, etc.) may provide increased utility by enabling ease of location and/or by identifying a function associated with the button in darker environments. In some examples, a path light or night light may illuminate an indoor or outdoor path. In some examples, a power outlet or wall jack may be backlit to enable ease of location or may provide light to provide home lighting.

In some examples, an electrical device may control lighting (e.g., backlighting) brightness in a direct (e.g., proportional, positively correlated, etc.) relationship to the detected ambient light level or in an inverse (e.g., inversely proportional, negatively correlated, etc.) relationship to the detected ambient light level. For instance, an electrical device may control lighting brightness (e.g., backlighting brightness) to increase with an increased ambient light level and/or to decrease with a decreasing ambient light level. In some examples, an electrical device may control lighting brightness (e.g., path light brightness, overhead light brightness) to increase with a decreased ambient light level and/or to decrease with an increasing ambient light level.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

Figure 1:
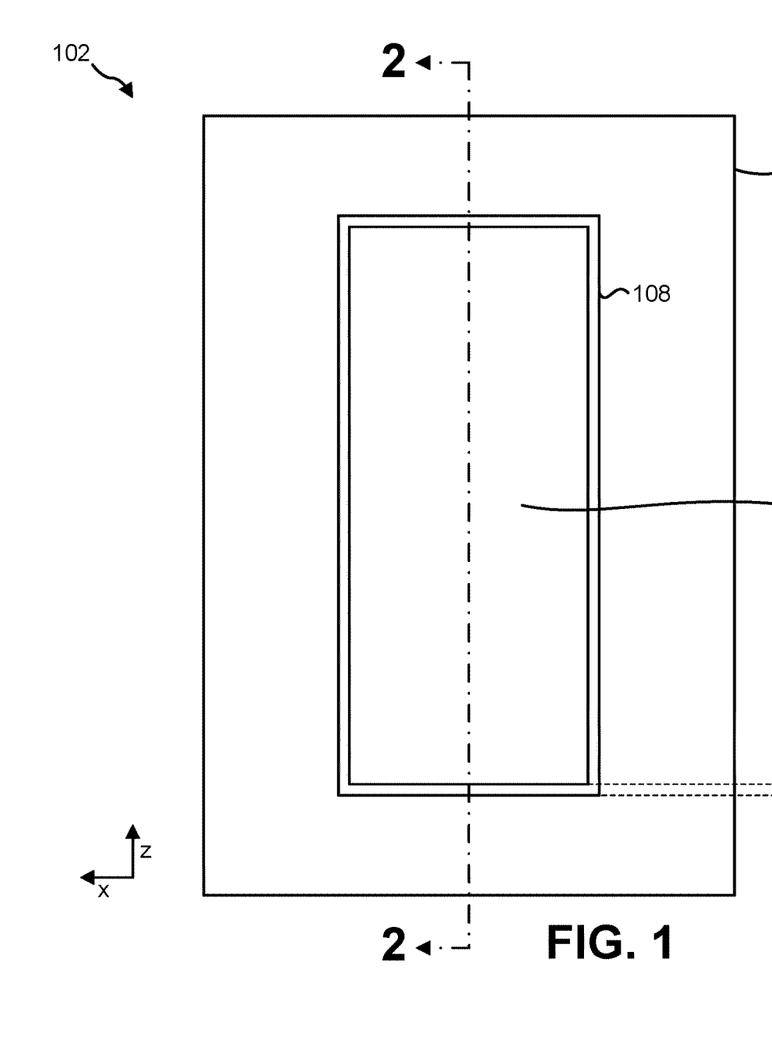
FIG. 1 is a diagram illustrating a front view of an example of an electrical device in accordance with some of the techniques and structures described herein.

FIG. 1 is a diagram illustrating a front view of an example of an electrical device 102 in accordance with some of the techniques and structures described herein. In the example of FIG. 1, the electrical device 102 includes a button 104 and a faceplate 106. The button 104 is a structure configured to actuate based on a physical contact (e.g., pressure, touch, push, etc.) and/or configured to detect a physical contact. The faceplate 106 is a cover. For instance, the faceplate 106 may conceal one or more components of the electrical device 102 when the faceplate 106 is attached to a body of the electrical device 102. In some examples, a subplate (not shown in FIG. 1) may be attached to the body of the electrical device 102 (e.g., may be screwed to a yoke plate of the electrical device 102). The faceplate 106 may be attached to the subplate (e.g., mechanically interfaced with the subplate, snapped to the subplate, etc.) to attach the faceplate 106 to the body of the electrical device 102. In some examples, the faceplate 106 may be attached to the body of the electrical device 102 with a fastener (e.g., screw, clip, adhesive, etc.). In some examples, the faceplate 106 may be attached to the body of the electrical device 102 without a subplate.

In some examples, the button 104 and/or the faceplate 106 may be fabricated from a material(s) such as a polymer(s), thermoplastic(s), resin(s), polycarbonate(s), metal(s), etc. For instance, the button 104 and/or the faceplate 106 may be fabricated by injection molding. The button 104 and faceplate 106 are illustrated in FIG. 1 in a height (e.g., z) dimension and a width (e.g., x) dimension.

In some examples, the button 104 is disposed to protrude through a window 108 of the faceplate 106. The window 108 may be an opening in the faceplate 106. For instance, the button 104 may be disposed to extend beyond the facial surface of the faceplate 106. In some examples, the button 104 or another structure may be disposed to protrude through a window 108 (e.g., above a level or plane of the facial surface of the faceplate 106), may be disposed approximately flush with an outer surface (e.g., facial surface) of the faceplate 106, or may be disposed below (e.g., recessed below) the level (e.g., plane) of the outer surface of the faceplate 106. While the button 104 is given as an example in FIG. 1, another structure (e.g., power socket structure, jack structure, port structure, keystone jack structure, light structure, keypad structure, etc.) may be disposed in the window 108 instead of the button 104 in some examples. In the example of FIG. 1, the window 108 is rectangular in shape. In some examples, the window 108 may be shaped differently (e.g., circularly shaped, rounded rectangularly shaped, oval shaped, irregularly shaped, curved in shape, etc.). In some examples, the faceplate 106 may include multiple windows 108 (e.g., two windows for two power outlets).

In some examples, a gap 110 is disposed between the button 104 (or another structure) and the faceplate 106. For instance, the disposition of the button 104 (or another structure) relative to the faceplate 106 may form a gap 110. In some examples, the gap 110 may be a space between the button 104 (or another structure) and the faceplate 106. In some examples, the gap 110 may be a space in the height (e.g., z) dimension. In some examples, the gap 110 may be a space between approximately parallel edges (e.g., within ±5° of parallel) of the button 104 (or another structure) and the faceplate 106. In some examples, a size (e.g., height) of the gap may be less than 5 millimeters (mm) (e.g., 0.81 mm, 0.9 mm, less than 1 mm, less than 3 mm, etc.). In some examples, the gap 110 may be sized such that one dimension (e.g., height) of the gap 110 is defined as a distance between the structure (e.g., button 104) and the faceplate 106. Another dimension (e.g., width) of the gap 110 may be defined based on a corresponding dimension of the structure (e.g., button 104). For instance, a largest dimension of the gap 110 may be the size of the corresponding dimension of the structure or larger. In some examples, another dimension (e.g., depth, distance between an outer edge of the gap 110 and the ambient light guide 112) of the gap 110 may be 1 centimeter (cm) or less (e.g., 3 mm, 2 mm, 1 mm, <1 mm, etc.).

Figure 2:
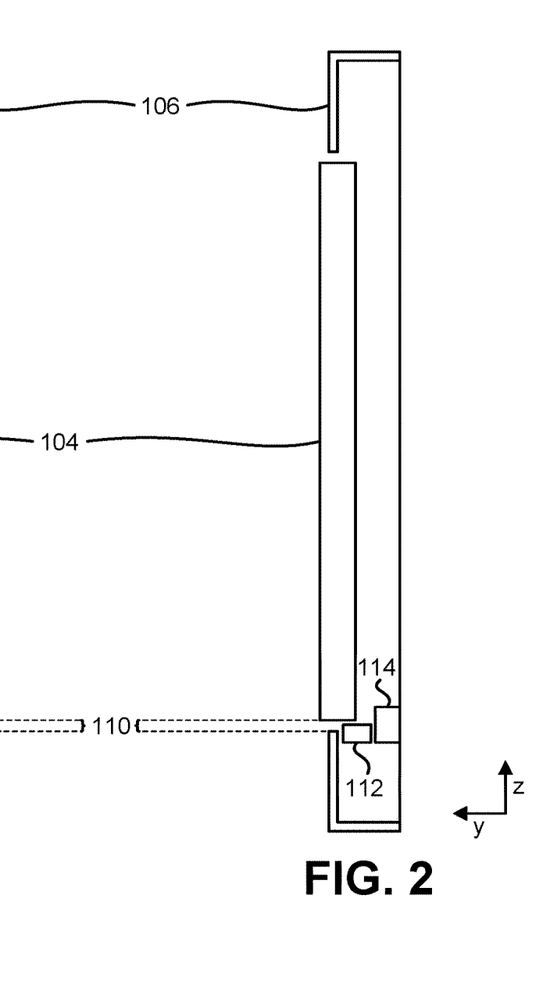
FIG. 2 is a side elevational cross-sectional view of the diagram of the example of the electrical device in FIG. 1.

FIG. 2 is a side elevational cross-sectional view of the diagram of the example of the electrical device 102 taken across the line 2-2 in FIG. 1. As illustrated in FIG. 2, the electrical device 102 may include an ambient light guide 112 and/or an ambient light sensor 114. The button 104 and faceplate 106 are illustrated in FIG. 2 in a height (e.g., z) dimension and a depth (e.g., y) dimension.

The ambient light guide 112 may be disposed to reside behind the gap 110. For instance, the ambient light guide 112 may be disposed behind a space (e.g., the gap 110) between and an edge of the button 104 and an edge of faceplate 106 (e.g., edge of the window 108). In some examples, the ambient light guide 112 may be disposed behind a space between an inner (e.g., bottom) edge or surface of the window 108 and an outer (e.g., bottom) edge or surface of the button 104 (or another structure). In some examples, In some examples, the ambient light guide 112 may be disposed at a depth of 1 centimeter (cm) or less (e.g., 3 mm, 2 mm, 1 mm, <1 mm, etc.) from the facial surface of the faceplate 106. In some examples, the ambient light guide 112 may be disposed adjacent to (e.g., below) a bottom edge and/or surface of the button 104 or another structure in the window 108 (e.g., may be disposed adjacent to a portion of the button 104 that is behind the facial surface of the faceplate 106. In some examples, the ambient light guide 112 may not be in contact with the button 104 (or another structure in the window 108). In some examples, the gap 110 may provide a margin to house the button 104 (or another structure in the window 108), may provide clearance for mechanical movement of the button 104, and/or may provide light passage to the ambient light guide 112. In some examples, the gap 110 may satisfy multiple conditions concurrently (e.g., mechanical button clearance and light passage). In some examples, the gap 110 may extend across a dimension (e.g., over the whole width dimension) of the button 104 or another structure in the window 108.

The ambient light guide 112 may be disposed to collect ambient light to pass through the gap 110. For instance, some of the ambient light in the environment may pass through the gap 110 to the ambient light guide 112. The ambient light guide 112 may conduct (e.g., carry, transmit, etc.) the ambient light from the environment to the ambient light sensor 114. In some examples, the ambient light guide 112 may be fabricated from a transparent material (e.g., polycarbonate). A transparent material may be a material that permits the conduction, carrying, and/or transmission of light. In some examples, a transparent material may be completely or partially transparent. For instance, the ambient light guide 112 may be fabricated with polycarbonate 945 (without an additive(s), for example) or fabricated with polycarbonate 945 with an additive (e.g., tint, coloring, whitening agent, R69, "milkiness," etc.) that causes the transparent molded member 104 to be semi-transparent.

The ambient light sensor 114 may be configured to sense the ambient light collected by the ambient light guide 112. For instance, the ambient light sensor 114 may be a photosensitive device(s) (e.g., photoelectric circuitry, photoresistor(s), photodiode(s), photocapacitor(s), phototransistor(s), charge-coupled device (CCD) sensor, complementary metal oxide semiconductor (CMOS) sensor, etc.). In some examples, the ambient light sensor 114 may produce a voltage and/or current that varies based on the brightness of light on the ambient light sensor 114. The ambient light sensor 114 may produce one or more sensed measurements indicating an ambient light level (e.g., brightness, lumens, etc.).

In some examples, the electrical device 102 may include circuitry (not shown in FIG. 2) to perform one or more operations based on the sensed measurement(s). For instance, the ambient light sensor 114 may provide the sensed measurement(s) to the circuitry, which may perform an operation(s) based on the sensed measurement(s). Some examples of the circuitry may include a controller, processor (e.g., microprocessor), state machine, field-programmable gate array (FPGA), application-specific integrated circuit (ASIC), switch(es), multiplexer(s), lookup table(s) (LUT(s)), etc. Examples of operations may include controlling a backlight level, controlling a light level, sending the sensed measurement(s) to another device(s) (e.g., home automation controller, server, network(s), etc.). For instance, the electrical device 102 may include (not shown in FIG. 2) a light source(s) (e.g., light-emitting diode(s) (LED(s))). The electrical device 102 (e.g., circuitry) may control the light source(s) to control a light level and/or backlight level based on the sensed measurement(s). For example, the circuitry (e.g., controller) may determine (e.g., look up) a light level setting based on a sensed measurement. In some examples, the circuitry (e.g., controller) may adjust the light level according to the determined light level setting. For instance, the electrical device 102 may include a controller configured to control a backlight of the electrical device 102 based on a sensed measurement of the ambient light produced by the ambient light sensor 114.

In some examples, the electrical device 102 may include a communication interface. For instance, the electrical device 102 may include a wired and/or wireless communication interface (e.g., Wi-Fi interface, Zigbee interface, Bluetooth interface, Universal Serial Bus (USB) interface, Ethernet interface, and/or power-line communication (PLC) interface, etc.). In some examples, the circuitry (e.g., controller) may send the sensed measurement(s) to another device(s) (e.g., home automation controller, server, network, etc.) using the communication interface. For instance, a sensed measurement(s) may be sent to a home automation controller and/or server to control lighting based on the sensed measurement(s). In some examples, a home automation controller may activate outdoor lighting when a sensed measurement indicates an ambient light level below a threshold.

Figure 3:
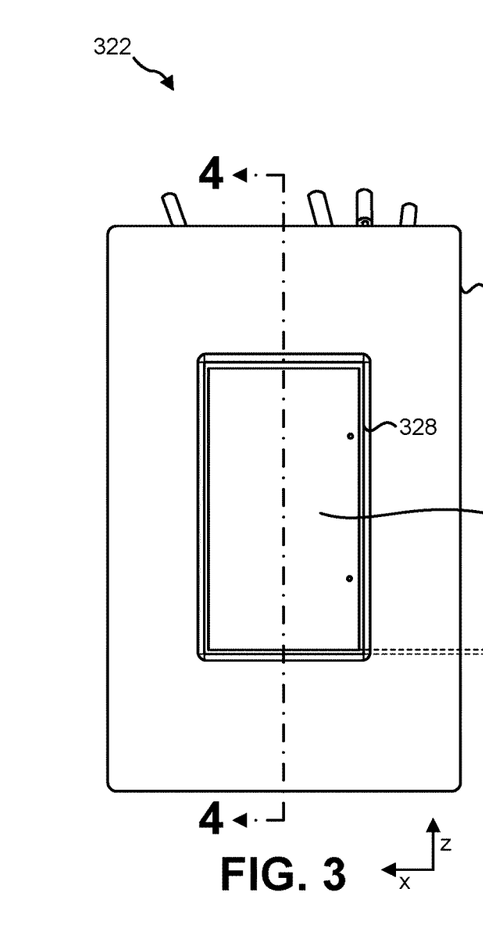
FIG. 3 is a diagram illustrating a front elevational view of an example of an electrical device.
Figure 4:
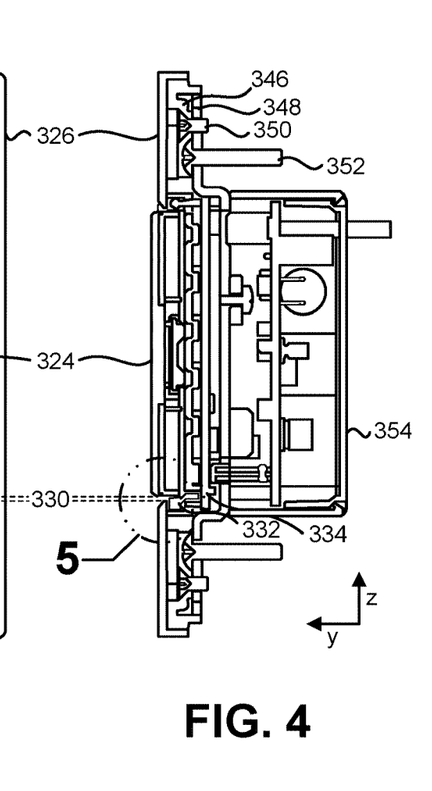
FIG. 4 is a side elevational cross-sectional view of the diagram of the example of the electrical device in FIG. 3.
Figure 5:
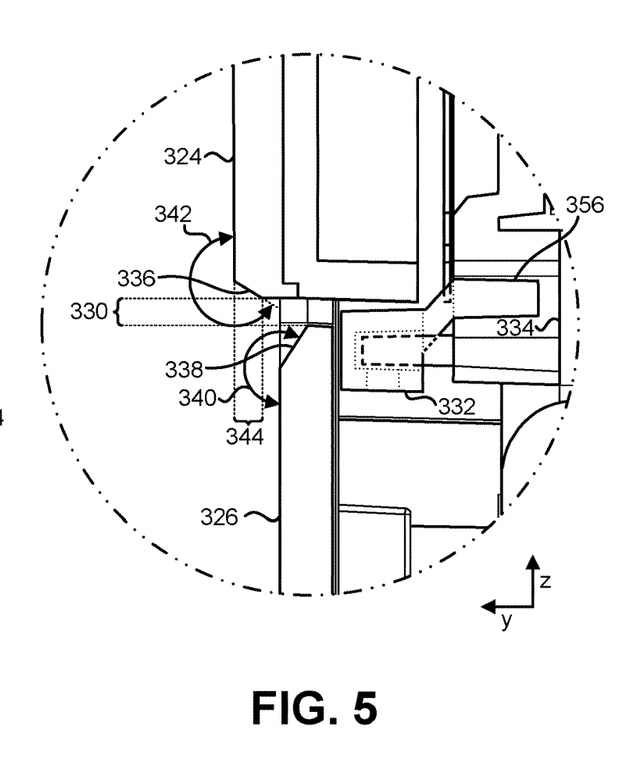
FIG. 5 is a side elevational, enlarged view of a region of FIG. 4.

FIG. 3 is a diagram illustrating a front elevational view of an example of an electrical device 322. FIG. 3 is illustrated in a height (e.g., z) dimension and a width (e.g., x) dimension. FIG. 4 is a side elevational cross-sectional view of the diagram of the example of the electrical device 322 taken across the line 4-4 in FIG. 3. FIG. 4 is illustrated in a height (e.g., z) dimension and a depth (e.g., y) dimension. FIG. 5 is a side elevational, enlarged view of a region 5 of FIG. 4. FIG. 5 is illustrated in a height (e.g., z) dimension and a depth (e.g., y) dimension. FIG. 3, FIG. 4, and FIG. 5 are described together.

The electrical device 322 may be an example of the electrical device 102 described in relation to FIG. 1 and FIG. 2. In the example of FIG. 3, the electrical device 322 includes a button 324, a faceplate 326, a window 328, a gap 330, an ambient light guide 332, and/or an ambient light sensor 334. The button 324, faceplate 326, window 328, gap 330, ambient light guide 332, and/or ambient light sensor 334 may be examples of a corresponding element(s) described in relation to FIG. 1 and/or FIG. 2. In some examples, the electrical device 322 may include a yoke plate 348. In some examples, the electrical device 322 (e.g., yoke plate 348) may be attached to a surface (e.g., wall, wall box, etc.) with a first fastener 352 (e.g., first screws). In some examples, the electrical device 322 may include a subplate 346. The subplate 346 may be attached to a body of the electrical device 322 (e.g., yoke plate 348) with a second fastener 350 (e.g., second screws). The faceplate 326 may be attached to the subplate 346 (e.g., mechanically interfaced with the subplate, snapped to the subplate, etc.) to attach the faceplate 326 to the body of the electrical device 322.

In the example of FIG. 4, the button 324 is disposed to protrude through the window 328 of the faceplate 326. For instance, the button 324 is disposed to extend beyond the facial surface of the faceplate 326. While the button 324 is given as an example in FIG. 3, another structure (e.g., power socket structure, jack structure, port structure, keystone jack structure, light structure, keypad structure, etc.) may be disposed in the window 328 instead of the button 324 in some examples. As illustrated in FIGS. 3-5, the gap 330 is disposed between the button 324 and the faceplate 326. In the example of FIGS. 3-5, the gap 330 is 0.81 mm in height.

In some examples, a faceplate may include a bevel along a gap to permit ambient light entry into a gap from an oblique angle. In the example of FIG. 3, the faceplate 326 includes a first bevel 338 along the gap 330 to permit (e.g., increase) ambient light entry into the gap 330 from an oblique angle (e.g., light shining in an obliquely upward direction towards the gap 330). In some examples, a bevel may be disposed at an angle within a range (e.g., 180°<bevel angle <270°). In the example of FIG. 3, a first angle 340 of the first bevel 338 is disposed at 213° relative to a facial surface of the faceplate 326. In the example of FIG. 3, a faceplate bevel depth is 0.91 mm.

In some examples, a structure (e.g., button) may include a bevel along a gap to permit ambient light entry into a gap from an oblique angle. In the example of FIG. 3, the button 324 includes a second bevel 336 along the gap 330 to permit (e.g., increase) ambient light entry into the gap 330 from an oblique angle (e.g., light shining in an obliquely downward direction towards the gap 330). In the example of FIG. 3, a second angle 342 of the second bevel 336 is disposed at 239° relative to a facial surface of the button 324. In the example of FIG. 3, a button bevel depth 344 is 0.90 mm.

As illustrated in FIG. 4 and FIG. 5, the electrical device 322 includes an ambient light guide 332 and an ambient light sensor 334. The ambient light guide 332 is disposed behind the gap 330. The ambient light guide 332 disposed partially underneath a side (e.g., bottom side, bottom surface) of the button 324. In some examples, the ambient light guide 332 includes a light pipe 356 to conduct (e.g., transmit, carry, etc.) ambient light to the ambient light sensor 334. As illustrated in FIG. 5, the light pipe 356 may be partially disposed behind the button 324 (in the height dimension). The ambient light sensor 334 may produce a sensed measurement(s) based on the light conducted to the ambient light sensor 334 by the ambient light guide 332.

In some examples, the electrical device 322 may include a housing 354. The housing 354 may house circuitry to perform one or more operations based on the sensed measurement(s). In the example of FIGS. 3-5, the electrical device 322 includes an LED to provide a backlight to the button 324. The electrical device 322 (e.g., circuitry) may control the LED to control a backlight level based on the sensed measurement(s). For example, the circuitry controls the brightness of the LED in a direct relationship with an ambient light brightness indicated by the sensed measurements.

Figure 6:
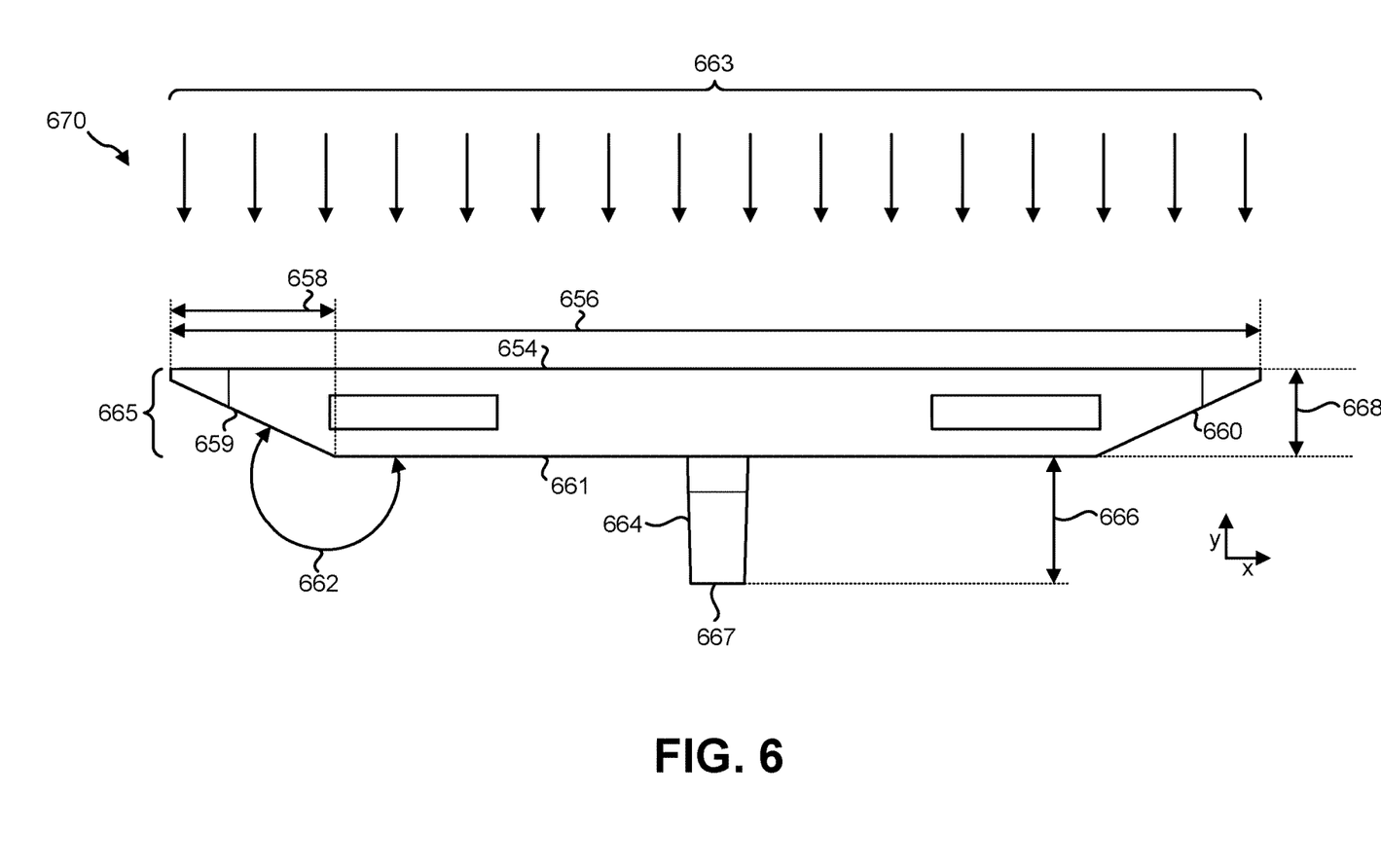
FIG. 6 is a diagram illustrating a top down view of an example of an ambient light guide in accordance with some examples of the techniques and structures described herein.

FIG. 6 is a diagram illustrating a top down view of an example of an ambient light guide 670 in accordance with some examples of the techniques and structures described herein. The ambient light guide 670 may be an example of one or more of the ambient light guides (e.g., of the ambient light guide 112 described in relation to FIG. 1, of the ambient light guide 332 described in relation to FIG. 4, etc.) described herein. FIG. 6 is illustrated in a depth (e.g., y) dimension and a width (e.g., x) dimension.

The ambient light guide 670 may include a collector structure 665 and/or a light pipe 664. The collector structure 665 may serve to receive and/or capture light 663. For instance, light 663 may pass through a gap between a structure and a faceplate of an electrical device. The light 663 may enter a face 654 (e.g., a facial surface) of the collector structure 665. The ambient light guide 670 (e.g., collector structure 665) may internally reflect light. In the example of FIG. 6, the collector structure 665 has a depth 668 of 2.62 mm. In the example of FIG. 6, the collector structure 665 (e.g., a face 654) has a width 656 of approximately 32.5 mm.

In some examples, the ambient light guide 670 includes oblique surfaces 659, 660 to reflect light towards a center of the ambient light guide 670. For instance, the collector structure 665 may include a face 654 and a rear 661 (e.g., a rear surface), where one or more sides are disposed between the face 654 and the rear 661. In the example of FIG. 6, two sides are oblique surfaces 659, 660 between the face 654 and rear 661, where the rear 661 is smaller in a width dimension than the face 654. In the example of FIG. 6, a first oblique surface 659 may form an angle 662 (e.g., a reflex angle) relative to the rear 661. For instance, the angle 662 may be 205° or another angle between 180° and 270°. In the example of FIG. 6, the oblique surface 659 has a width 658 of 4.9 mm. In some examples, the second oblique surface 660 may be symmetrical or asymmetrical relative to the first oblique surface 659 (across a centerline in a width dimension, for instance). In some examples, an ambient light guide may not include oblique angles. For instance, a collector structure may be formed as a rectangular prism or another shape.

In some examples, the ambient light guide 670 may extend over a majority of the gap in a width dimension. For instance, the ambient light guide 670 (e.g., the face 654) may extend over (e.g., cover) more than 50% of the width of the gap. In some examples, the ambient light guide 670 (e.g., the face 654) may extend to a complete width of the gap. In some examples, the ambient light guide 670 (e.g., the face 654) may be larger than (e.g., extend beyond) the width of the gap.

In some examples, the ambient light guide 670 includes a light pipe 664 extending from the collector structure 665 toward the ambient light sensor (not shown in FIG. 6). For instance, light collected in the collector structure 665 may be conducted to the light pipe 664. The light may exit the light pipe 664 to the ambient light sensor. In some examples, the light pipe 664 is polyhedral in shape. For instance, the light pipe 664 may form a channel with four side surfaces and an end (e.g., exit) surface 667. In some examples, the end surface may be rectangular in shape. In the example of FIG. 6, the light pipe 664 has a depth 666 of 3.79 mm.

Figure 7:
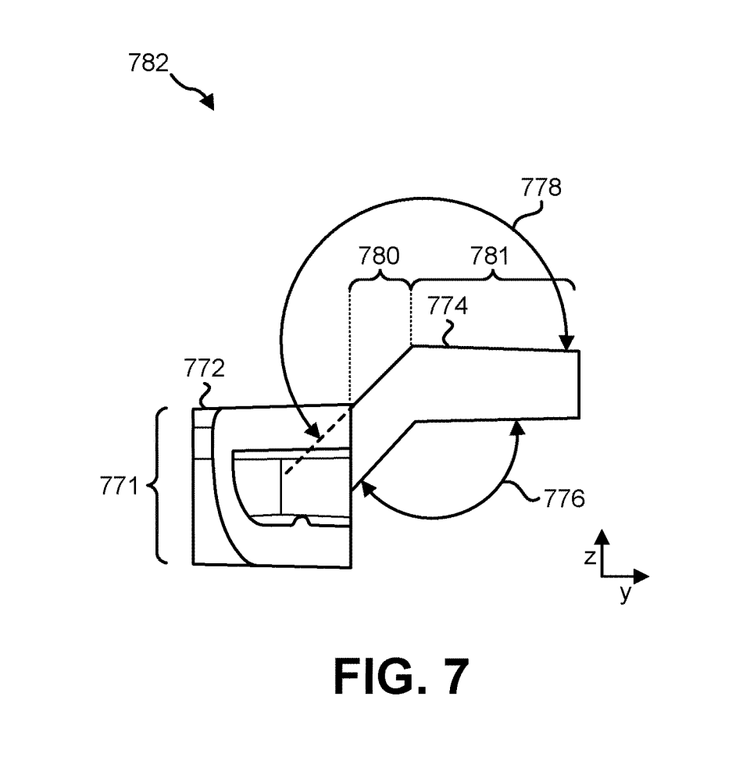
FIG. 7 is a diagram illustrating a side elevation view of an example of an ambient light guide in accordance with some examples of the techniques and structures described herein.

FIG. 7 is a diagram illustrating a side elevation view of an example of an ambient light guide 782 in accordance with some examples of the techniques and structures described herein. The ambient light guide 782 may be an example of one or more of the ambient light guides (e.g., of the ambient light guide 112 described in relation to FIG. 1, of the ambient light guide 332 described in relation to FIG. 4, of the ambient light guide 670 described in relation to FIG. 6, etc.) described herein. FIG. 7 is illustrated in a height (e.g., z) dimension and a depth (e.g., y) dimension.

The ambient light guide 782 may include a collector structure 771 and/or a light pipe 774. In some examples, the light pipe 774 includes an angled neck extending above a top surface 772 (e.g., plane) of the collector structure 771 of the ambient light guide 782. For instance, the light pipe 774 may extend obliquely upward from a rear of the collector structure 771. In the example of FIG. 7, an upwardly extending portion of the light pipe 774 has a depth 780 of 1 mm. In some examples, the light pipe 774 may include an extension portion 781. The extension portion 781 may form a top angle 778 and a bottom angle 776 with the upwardly extending portion. In some examples, the top angle 778 may be a reflex angle and/or the bottom angle 776 may be an obtuse angle. For instance, the top angle 778 may be 229° and/or the bottom angle 776 may be 134°.

Figure 8:
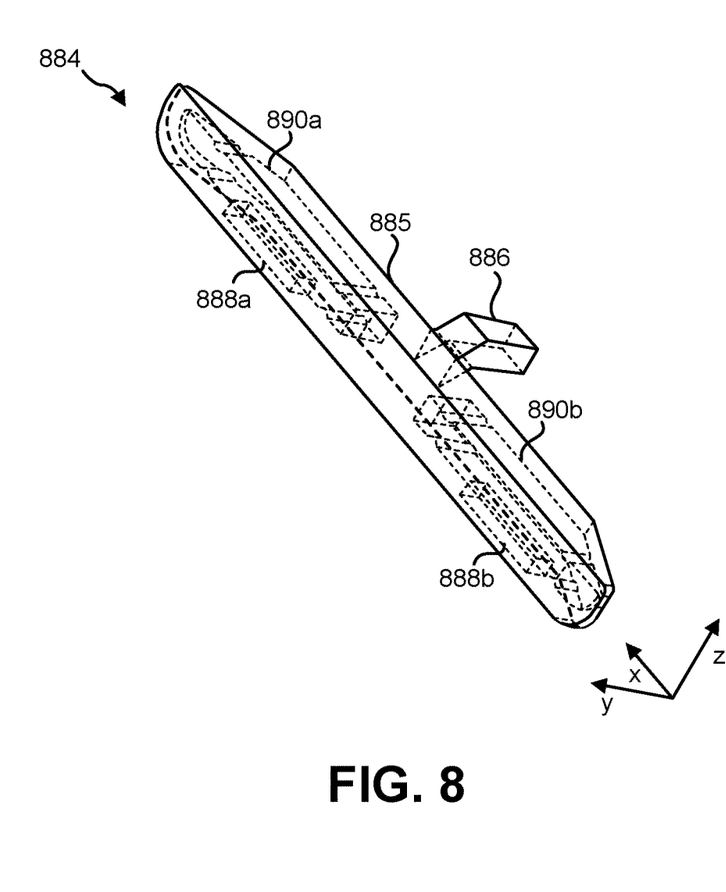
FIG. 8 is a diagram illustrating a perspective view of an example of an ambient light guide in accordance with some examples of the techniques and structures described herein.

FIG. 8 is a diagram illustrating a perspective view of an example of an ambient light guide 884 in accordance with some examples of the techniques and structures described herein. The ambient light guide 884 may be an example of one or more of the ambient light guides (e.g., of the ambient light guide 112 described in relation to FIG. 1, of the ambient light guide 332 described in relation to FIG. 4, of the ambient light guide 670 described in relation to FIG. 6, of the ambient light guide 782 described in relation to FIG. 7, etc.) described herein. FIG. 8 is illustrated in a height (e.g., z) dimension, a width (e.g., x) dimension, and a depth (e.g., y) dimension.

The ambient light guide 884 may include a collector structure 885 and a light pipe 886. In some examples, an ambient light guide may include mounting features. In the example illustrated in FIG. 8, the collector structure 885 includes first slots 888*a-b* and second slots 890*a-b*. The first slots 888*a-b* and/or the second slots 890*a-b* may serve as mounting features to mount (e.g., attach) the ambient light guide 884 to a body of an electrical device (e.g., the electrical device 102 described in relation to FIG. 1, the electrical device 322 described in relation to FIG. 3, etc.). For instance, an electrical device may include one or more protrusions (e.g., tabs) that may be disposed in one or more of the first slots 888*a-b* and/or second slots 890*a-b* to hold the ambient light guide 884.

Figure 9:
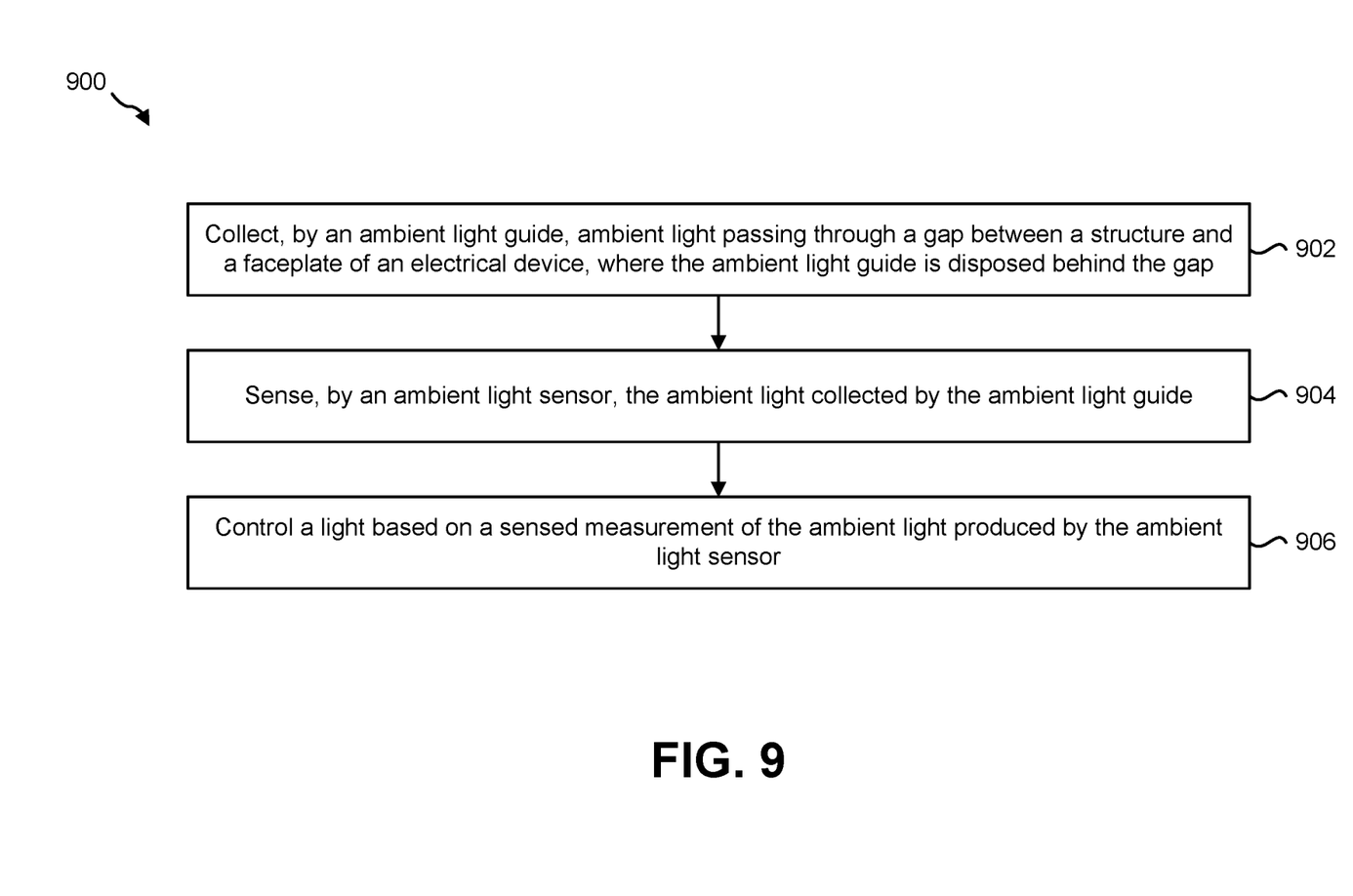
FIG. 9 is a flow diagram illustrating one configuration of a method for sensing ambient light.

FIG. 9 is a flow diagram illustrating one configuration of a method 900 for sensing ambient light. In some examples, the method 900 may be performed by one or more of the electrical devices (e.g., electrical device 102, electrical device 322, etc.) described herein.

An electrical device may collect 902, by an ambient light guide, ambient light passing through a gap between a structure and a faceplate of the electrical device, where the ambient light guide is disposed behind the gap. In some examples, collecting 902 the ambient light may be performed as described in relation to one or more of FIGS. 1-8.

The electrical device may sense 904, by an ambient light sensor, the ambient light collected by the ambient light guide. In some examples, sensing 904 the ambient light may be performed as described in relation to one or more of FIGS. 1-8.

The electrical device may control 906 a light (e.g., backlight) based on a sensed measurement of the ambient light produced by the ambient light sensor. For instance, the electrical device may control a light (e.g., backlight) of the electrical device and/or may send the sensed measurement to another device (e.g., home automation controller, server, etc.) to control a light. In some examples, controlling 906 the ambient light may be performed as described in relation to one or more of FIGS. 1-5.

Figure 10:
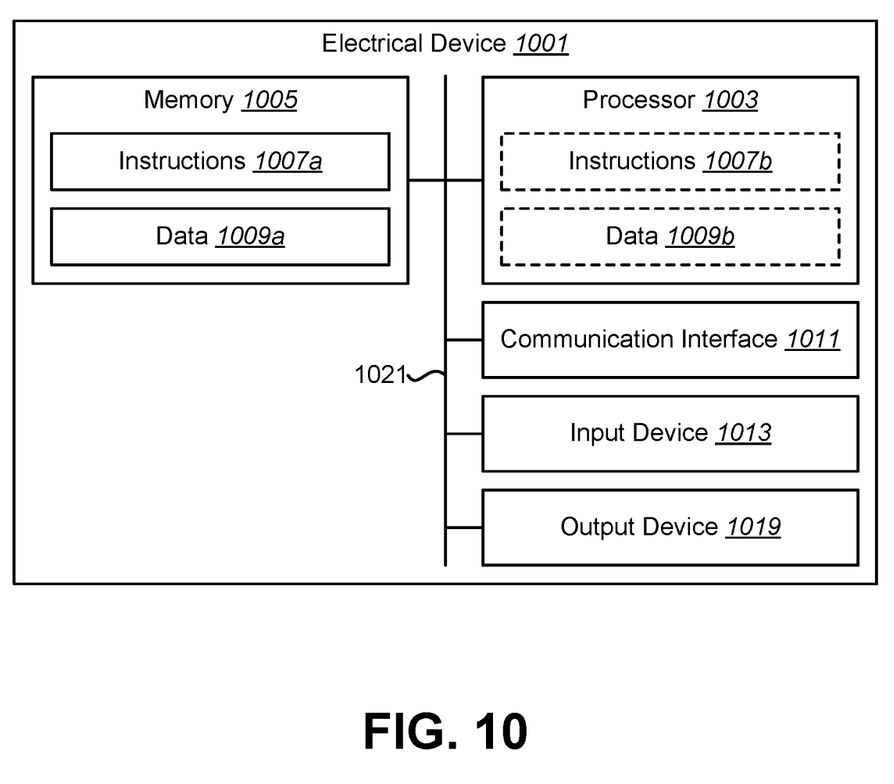
FIG. 10 is a block diagram illustrating various components that may be utilized in an electrical device.

FIG. 10 is a block diagram illustrating various components that may be utilized in an electrical device 1001. In some examples, one or more of the electrical devices described herein (e.g., electrical device 102, electrical device 322, etc.). Examples of the electrical device 1001 may include a light switch, wall switch, dimmer, control panel, push button switch, keyboard, mouse, game controller, click pad, touch pad, keypad, doorbell, thermostat, sprinkler controls, vehicle console, power outlet, wall jack, light (e.g., path light, night light, etc.), etc.

The electrical device 1001 is shown with a processor 1003 and memory 1005. The processor 1003 may control the operation of the electrical device 1001 and may be embodied as a microprocessor, a microcontroller, an ASIC, an FPGA, a state machine, a digital signal processor (DSP) and/or another device. The processor 1003 may perform logical and arithmetic operations based on program instructions 1007*a* and/or data 1009*a* stored within the memory 1005. The instructions 1007*a* in the memory 1005 may be executable to implement one or more of the operation(s), function(s), approach(es), technique(s), and/or method(s) described herein. FIG. 10 illustrates instructions 1007*b* and/or data 1009*b* being loaded onto the processor 1003. The instructions 1007*b* and/or data 1009*b* may be the instructions 1007*a* and/or data 1009*a* (or portions thereof) stored in memory 1005.

The electrical device 1001 may also include one or more communication interfaces 1011 for communicating with other devices. The communication interface(s) 1011 may be based on wired communication technology and/or wireless communication technology, such as ZigBee®, WiMax®, WiFi®, Bluetooth® and/or cellular protocols, such as Global System for Mobile Communications (GSM®), etc.

The electrical device 1001 may also include one or more input devices 1013 and/or one or more output devices 1019. The input devices 1013 and output devices 1019 may facilitate input and/or output.

Instructions 1007*a* and data 1009*a* may be stored in the memory 1005. The processor 1003 may load and execute instructions 1007*b* from the instructions 1007*a* in memory 1005 to implement various functions. Executing the instructions 1007*a* may involve the use of the data 1009*a* that is stored in the memory 1005. The instructions 1007*b* and/or data 1009*b* may be loaded onto the processor 1003. The instructions 1007 may be executable to implement the one or more of the operation(s), function(s), approach(es), technique(s), and/or method(s) shown herein and the data 1009 may include one or more of the various pieces of data described herein.

The memory 1005 may be any electronic component capable of storing electronic information. The memory 1005 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), an ASIC (Application Specific Integrated Circuit), registers and so forth, including combinations thereof. The various components of the electrical device 1001 may be coupled together by a bus system 1021, which may include a power bus, a control signal bus and a status signal bus, in addition to a data bus. However, for the sake of clarity, the various buses are illustrated in FIG. 10 as the bus system 1021.

In the above description, reference numbers have sometimes been used in connection with various terms. Where a term is used in connection with a reference number, it may refer to a specific element that is shown in one or more of the Figures. Where a term is used without a reference number, it may refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The method(s) disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. An electrical device for fixedly mounting to a surface coplanar to a frontside of the electrical device providing user input actuation, the electrical device comprising:
    a faceplate having a window through which at least one button protrudes towards the frontside of the electrical device, wherein a gap is disposed between an entirety of the at least one button and the faceplate;
    a housing having electrical circuitry for performing operations associated with the user input actuation;
    a yoke plate assembly fixedly attached to the housing and the faceplate and including a fastener attaching the electrical device to the surface;
    an ambient light sensor disposed between the yoke plate and the faceplate and configured to sense ambient light incident on the front face; and
    an ambient light guide disposed behind the gap, the ambient light guide having at least: (1) a collector structure collecting ambient light passing through the gap between the yoke plate and the faceplate, and (2) a light pipe directing a flow of the collected ambient light towards the ambient light sensor.

2. The electrical device of claim 1, wherein the faceplate comprises a bevel along the gap to permit ambient light entry into the gap from an oblique angle, and
    wherein the yoke plate assembly comprises a yoke plate and a subplate that is fixedly attached between the yoke plate and the faceplate.

3. The electrical device of claim 1, wherein the at least one button comprises a bevel along the gap to permit ambient light entry into the gap from an oblique angle.

4. The electrical device of claim 1, wherein the ambient light guide comprises oblique surfaces to reflect light towards a center of the ambient light guide.

5. The electrical device of claim 1, wherein the ambient light guide extends over a majority of the gap in a width dimension.

6. The electrical device of claim 1, wherein a size of the gap is 5 millimeters or less.

7. The electrical device of claim 1, further comprising a controller configured to control a backlight of the electrical device based on a sensed measurement of the ambient light produced by the ambient light sensor.

8. The electrical device of claim 1, wherein the ambient light guide is formed as one body comprising the light pipe extending from the collector structure towards the ambient light sensor.

9. The electrical device of claim 8, wherein the light pipe is polyhedral in shape.

10. The electrical device of claim 8, wherein the light pipe comprises an angled neck
    extending above a top surface of the collector structure of the ambient light guide.

* * * * *